US008791853B2

(12) United States Patent
Mitchell

(10) Patent No.: US 8,791,853 B2
(45) Date of Patent: Jul. 29, 2014

(54) AIR-TO-GROUND ANTENNA

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 141 days.

(21) Appl. No.: 13/090,792

(22) Filed: Apr. 20, 2011

(65) Prior Publication Data

US 2012/0268319 A1 Oct. 25, 2012

(51) Int. Cl.
*G01S 13/95* (2006.01)

(52) U.S. Cl.
USPC ........................ 342/26 B; 342/26 R; 342/350

(58) Field of Classification Search
USPC .......................... 342/62, 350, 359, 361, 367; 343/797–800
See application file for complete search history.

(56) References Cited

U.S. PATENT DOCUMENTS

| | | | | |
|---|---|---|---|---|
| 4,450,449 | A * | 5/1984 | Jewitt | 343/700 MS |
| 4,651,159 | A * | 3/1987 | Ness | 343/700 MS |
| 5,686,929 | A * | 11/1997 | Thiere et al. | 343/792.5 |
| 6,643,526 | B1 * | 11/2003 | Katz | 455/562.1 |
| 6,771,218 | B1 * | 8/2004 | Lalezari et al. | 342/373 |
| 6,952,179 | B1 * | 10/2005 | Jones | 342/62 |
| 7,327,317 | B2 * | 2/2008 | Heiniger | 343/700 MS |
| 7,369,085 | B1 * | 5/2008 | Jacomb-Hood | 342/374 |
| 2005/0237266 | A1 * | 10/2005 | Durham et al. | 343/909 |
| 2006/0229103 | A1 * | 10/2006 | Monk | 455/562.1 |
| 2008/0026796 | A1 * | 1/2008 | Thomas | 455/562.1 |
| 2008/0303733 | A1 * | 12/2008 | Chiu et al. | 343/770 |
| 2009/0034448 | A1 | 2/2009 | Miller et al. | |
| 2009/0066601 | A1 * | 3/2009 | Eom et al. | 343/798 |
| 2010/0052994 | A1 | 3/2010 | Llorens del Rio et al. | |
| 2010/0177011 | A1 * | 7/2010 | Sego et al. | 343/893 |
| 2010/0225554 | A1 | 9/2010 | Huang et al. | |

OTHER PUBLICATIONS

Fodor, Gabor, et al., "Intercell Interference Coordination in OFDMA Networks and in the 3GPP Long Term Evolution System", Journal of Communications, vol. 4, No. 7, Aug. 2009, Academy Publisher, pp. 445-453.

* cited by examiner

*Primary Examiner* — John B Sotomayor
*Assistant Examiner* — Marcus Windrich
(74) *Attorney, Agent, or Firm* — Donna P. Suchy; Daniel M. Barbieri

(57) ABSTRACT

A directional antenna is disclosed. The directional antenna may include a support structure for defining a support surface; a first antenna stack positioned on the support surface, the first antenna stack having multiple antenna elements oriented in a first orientation, allowing the first antenna stack to concentrate radiations in a first direction; a second antenna stack positioned on the support surface, the second antenna stack having multiple antenna elements oriented in a second orientation, the second orientation being rotated a predetermined angle with respect to the first orientation, allowing the second antenna stack to concentrate radiations in a second direction different from the first direction; and a controller configured to selectively activate at least one of the first antenna stack or the second antenna stack to steer the radiations of the directional antenna in different directions without physical/mechanical movement of the antenna stacks.

19 Claims, 14 Drawing Sheets

AIR-TO-GROUND ANTENNA

CROSS-REFERENCE TO RELATED APPLICATIONS

This application is related to co-pending U.S. patent application Ser. No. 12/827,632 filed on Jun. 30, 2010 and entitled "Aviation Cellular Communications System and Method," which is incorporated herein by reference.

This application is also related to co-pending U.S. patent application Ser. No. 12/891,107 filed on Sep. 27, 2010 and entitled "Doppler Compensated Communications Link," which is incorporated herein by reference.

This application is further related to co-pending U.S. patent application Ser. No. 12/891,139 filed on Sep. 27, 2010 and entitled "Airborne Cell Tower Selection System and Method," which is incorporated herein by reference.

TECHNICAL FIELD

The present disclosure relates generally to communication systems and more particularly to a directional antenna suitable for air-to-ground communications.

BACKGROUND

Broadband data solutions for mobile phones and portable computers have become increasingly popular and necessary. However, providing data solutions that achieve the desired bandwidth may be difficult in certain situations. One example of such a situation is air travel, as conventional mobile phones are very undependable during flight as they do not transmit at a high enough power to maintain communication with the ground networks. Furthermore, many world-wide spectrum regulators have not approved the uncontrolled RF emissions from cellular devices onboard aircraft.

Certain aircraft communication systems have been developed to provide in-flight data solutions. Such a system may utilize a set of custom towers on the ground that point their signals upwards (towards the sky) to communicate with receivers installed on aircrafts. The receivers and the set of custom towers work similarly to that of conventional mobile phones and cell towers. While in-flight data solutions may be provided utilizing such systems, they are very expensive to develop/operate, and they duplicate the mobile phone equipment people already have and would prefer to use. Furthermore, the receivers used in such a system are generally omnidirectional, which may have limited antenna gain due to lack of directionality. Limited antenna gain results in limited data rate, which is undesirable for a broadband data solution. In addition, developing and operating a set of custom towers for communication purposes is subject to various regulations. As a result, for example, certain aircraft communication systems currently in operation are restricted to horizontal polarization only, and there may be very little benefit even if dual polarization antennas are used in such systems.

Conventional ground-based cellular networks may provide a low-cost broadband option for in-flight data solutions. In addition, communication standards such as Long Term Evolution (LTE), 3GPP, UMTS, WiMax and other 4 G and 5 G type technologies as employed without modification by the cellular network carriers may enable more in transit bandwidth capacity compared to the bandwidth provided by the custom towers of the aircraft communication system described above. Therefore, it may be appreciated to provide the ability for an aircraft to communicate with existing ground-based cellular networks and to provide in-flight data solutions utilizing the ground-based cellular networks. In addition, such cellular networks already have established data communication infrastructures, which may be utilized without the need to build custom towers as required in other in-flight data solutions.

However, the elevated position of the aircraft may pose issues with ground networks because of the possibility of illuminating many ground stations/towers in the same band. This may cause the antenna located in the aircraft to induce or transmit signals to and/or receive signals from more than one tower at once. Studies have shown that such behaviors may desensitize receivers at both ends and introduce interferences (for example, as shown in: *LTE for UMTS*, Harri Holma et al., page 315). Furthermore, the signals provided by the conventional ground stations (cell towers) may not be directed upwardly towards the flying aircraft. Therein lies the need to provide an air-to-ground antenna suitable for communicating with ground stations.

SUMMARY

The present disclosure is directed to a directional antenna. The directional antenna may be installed in an aircraft and may provide air-to-ground communications with ground stations/towers of a cellular network. The antenna is configured for defining enough directionality to reduce the field of view of ground cellular stations while simultaneously enabling communication with ultra low signal levels from each downward directed antenna. The air-to-ground communication system may be installed on an available surface around an airborne weather radar. The air-to-ground communication system may include an planar antenna array stack (antenna stack) positioned on the surface around the airborne weather radar, the antenna stack having a plurality of antenna elements, the plurality of antenna elements of the antenna stack being oriented in the same orientation. The air-to-ground communication system may also include a controller communicatively connected with the antenna stack, the controller being configured for controlling a phase angle and gain of at least one of the plurality of antenna elements of the antenna stack, allowing the antenna stack to concentrate radiations in a direction.

A further embodiment of the present disclosure is directed to an air-to-ground communication system for installation in an aircraft. The air-to-ground communication system may include a first antenna stack positioned on a support surface located on the aircraft. The first antenna stack having a plurality of antenna elements, the plurality of antenna elements of the first antenna stack being oriented in a first orientation, allowing the first antenna stack to concentrate radiations in a first direction. The air-to-ground communication system may also include a second antenna stack positioned on the support surface. The second antenna stack having a plurality of antenna elements, the plurality of antenna elements of the second antenna stack being oriented in a second orientation, allowing the second antenna stack to concentrate radiations in a second direction different from the first direction. The air-to-ground communication system may further include a controller communicatively connected with the first antenna stack and the second antenna stack. The controller may selectively activate at least one of: the first antenna stack for concentrating radiations of the directional antenna in the first direction, or the second antenna stack for concentrating radiations of the directional antenna in the second direction.

An additional embodiment of the present disclosure is directed to a directional antenna. The directional antenna may include a support structure for defining a support surface; a first antenna stack positioned on the support surface, the first antenna stack having a plurality of antenna elements, the plurality of antenna elements of the first antenna stack being oriented in a first orientation, allowing the first antenna stack to concentrate radiations in a first direction; a second antenna stack positioned on the support surface, the second antenna stack having a plurality of antenna elements, the plurality of antenna elements of the second antenna stack being oriented in a second orientation, the second orientation being rotated a predetermined angle with respect to the first orientation, allowing the second antenna stack to concentrate radiations in a second direction different from the first direction; and a controller communicatively connected with the first antenna stack and the second antenna stack, the controller being configured for selectively activating at least one of: the first antenna stack for concentrating radiations of the directional antenna in the first direction, or the second antenna stack for concentrating radiations of the directional antenna in the second direction.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a directional antenna. The directional antenna may be installed in an aircraft and may provide air-to-ground communications with ground stations/towers of a cellular network. The antenna is configured for defining enough directionality to reduce the field of view of ground cellular stations while simultaneously providing enough RF gain to provide enough link-margin with each tower. Reducing the number of ground stations visible to the antenna may reduce transmit and receive interference effects. Furthermore, the directional antenna of the present disclosure may be completely enclosed within the aircraft to minimize the airflow drag associated with the antenna (therefore preserving the aircraft fuel efficiency). In one embodiment, the directional antenna is installed in the nose section of the aircraft.

Figure 1:
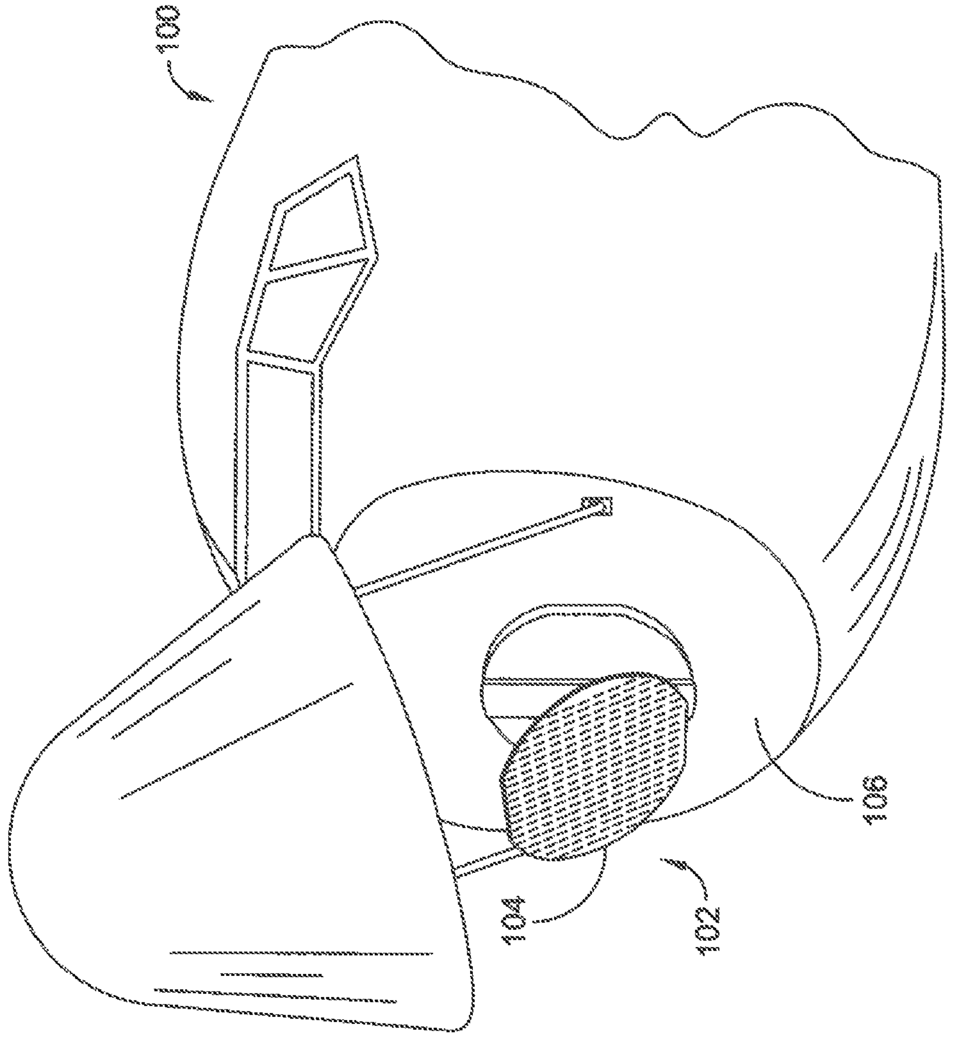
FIG. 1 is a partial perspective view depicting a nose section of an aircraft.

Referring to FIG. 1, a partial perspective view depicting a nose section 102 of an exemplary aircraft 100 is shown. The aircraft 100 may be equipped with an airborne weather radar 104, which may typically be installed in the nose section 102 of the aircraft 100. Due to the limited space available in the nose section 102, the antenna in accordance with the present disclosure may be installed on the support surface 106 around the airborne weather radar 104 or directly on the weather radar mounting system.

Figure 2:
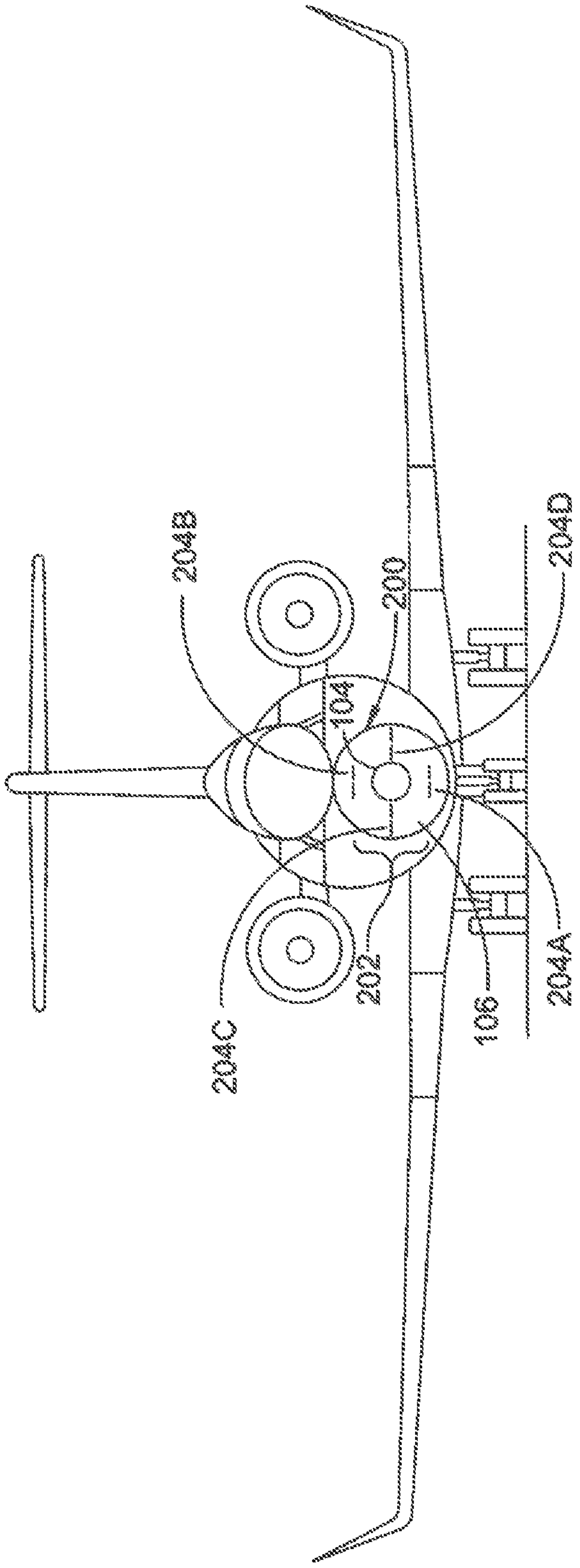
FIG. 2 is front view of a directional antenna installed in a nose section of an aircraft.

Referring to FIG. 2, an air-to-ground antenna 200 including an antenna stack 202 is shown. The antenna stack 202 may include multiple antenna elements 204 positioned on the surface 106 around the airborne weather radar 104. The surface 106 may provide electrical and mechanical support for the antenna elements 204. The antenna elements 204 within the same stack may be jointly operated together utilizing a RF diplexer, a combiner (e.g., a programmable phase shifter), gain or attenuation stages or the like in order to deliver the signals for this stack in a matched manner. Furthermore, the antenna elements 204 within the same antenna stack 202 are oriented in the same orientation. For instance, in the example illustrated in FIG. 2, all antenna elements 204 of the antenna stack 202 are oriented so that they are parallel to the lateral axis of the aircraft.

In one embodiment, the antenna stack 202 may include a first antenna element 204A positioned on the surface 106 below the weather radar 104 and a second antenna element 204B positioned on the surface 106 above the weather radar 104. Each antenna element may be configured as a dipole antenna, a monopole antenna, a patch antenna, a folded antenna, a loop antenna, or a stripline antenna or the like. Arranging the antenna elements 204A and 204B in this manner forms a stack (may also be referred to as an array, a group, a set or the like) having a linear distribution of antenna elements. An antenna stack allows for better control of RF propagation direction than a single antenna element. Generally, an antenna stack having more antenna elements may provide better directional control. Therefore, it is contemplated that the antenna stack 202 may include more antenna elements without departing from the spirit and scope of the present disclosure.

As the example illustrated in FIG. 2, the antenna stack 202 may include a third antenna element 204C positioned on the surface 106 on one side of the weather radar 104 and a fourth antenna element 204D positioned on the surface 106 on another side of the weather radar 104. The third antenna element 204C and the fourth antenna element 204D are so positioned to accommodate for the space occupied by the weather radar 104. In one embodiment, the third antenna element 204C and the fourth antenna element 204D may be spaced apart but configured to behave jointly as a joint antenna element. In this manner, the joint element (formed by the third antenna element 204C and the fourth antenna element 204D) may form the antenna stack 202 together with the first antenna element 204A and the second antenna element 204B. For example, antenna elements 204A through 204D may be radially separated by one wavelength (e.g., about 15 inches for the 700 MHz band implementation) center-to-center, providing conditions for effective phase angle shifting (to be explained in detail below).

While the antenna stack 202 formed by four antenna elements may provide better directional control compared to an alternative configuration with fewer antenna elements, it is contemplated that the specific arrangement of the antenna stack may be based on the availability of space around the weather radar 104. Therefore, it is contemplated that the antenna stack may include different number of antenna elements for different installation environment.

In one embodiment, all antenna elements of the antenna stack 202 are horizontally polarized (with respect to Earth ground, or horizon) and configured for communicating with ground stations. For example, each antenna element may be implemented as a dipole antenna configured for operating with GSM, CDMA, LTE, WiMax, future 5 G standards or the like within the 698-3600 MHz spectrum region, commonly designated for commercial and public safety uses in the United States and other countries world-wide. It is contemplated that additional antenna elements may be added or the existing ones may be adapted to support more than one frequency band designated for other standards and purposes and/or in other countries without departing from the spirit and scope of the present disclosure.

Figure 3C:
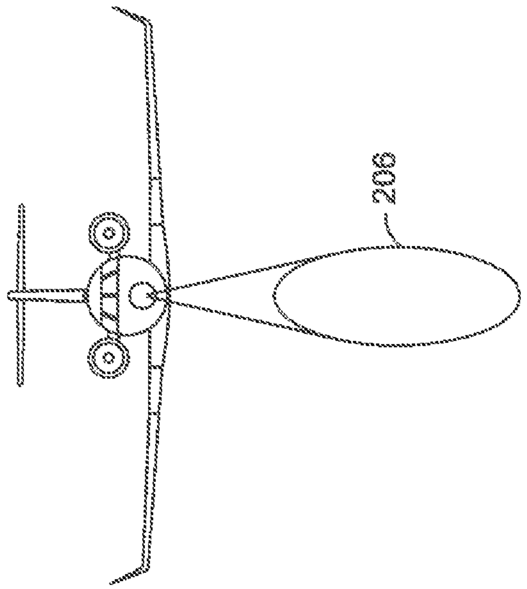
FIG. 3*a-c* illustrates the directional beam provided by the directional antenna of FIG. 2.
Figure 3A:
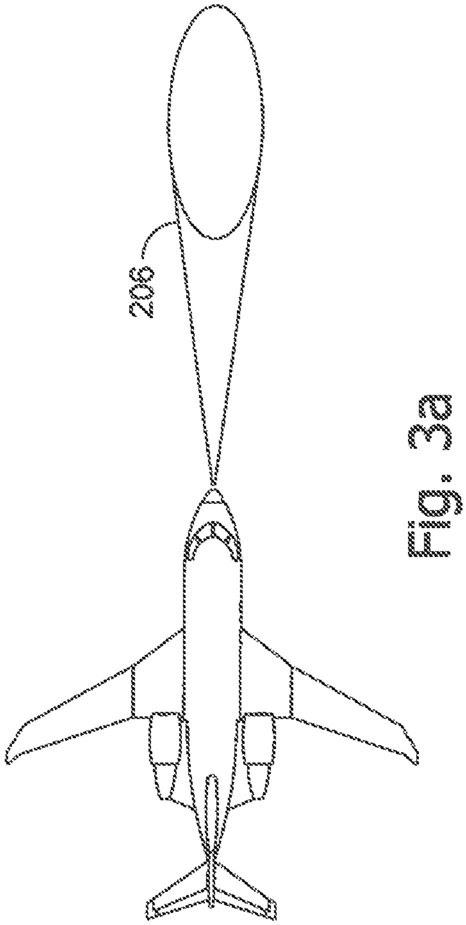
Figure 3B:
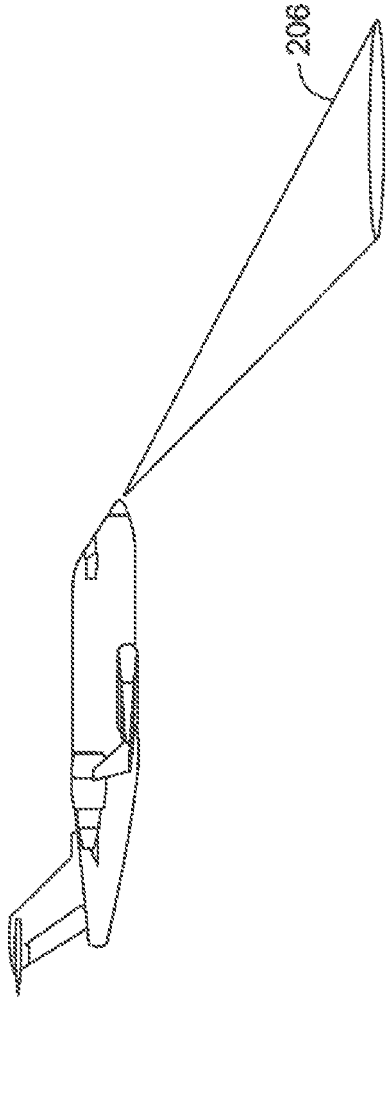
Figure 4:
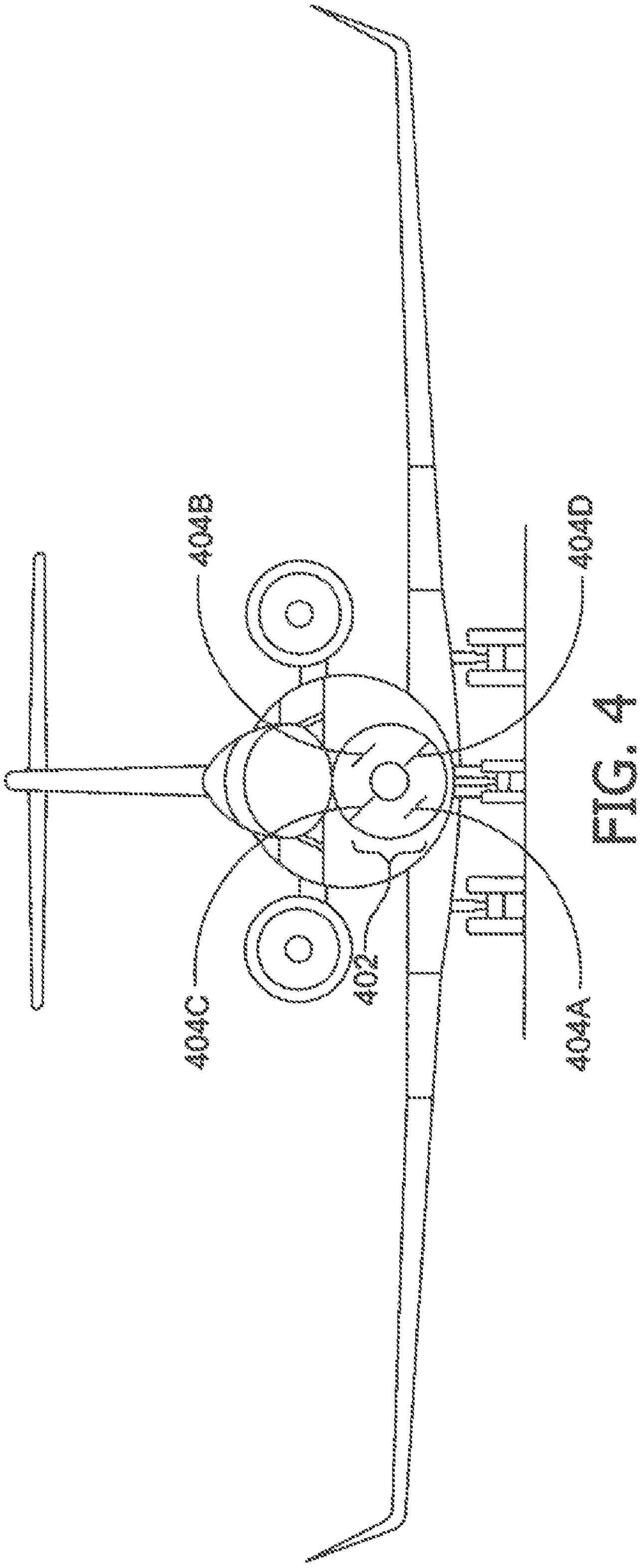
FIG. 4 is front view of another directional antenna installed in a nose section of an aircraft.
Figure 5A:
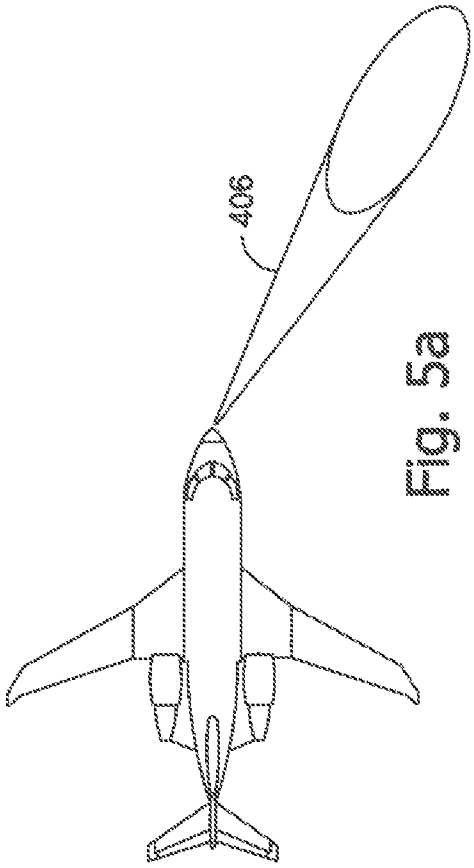
FIG. 5*a-c* illustrates the directional beam provided by the directional antenna of FIG. 4.
Figure 5B:
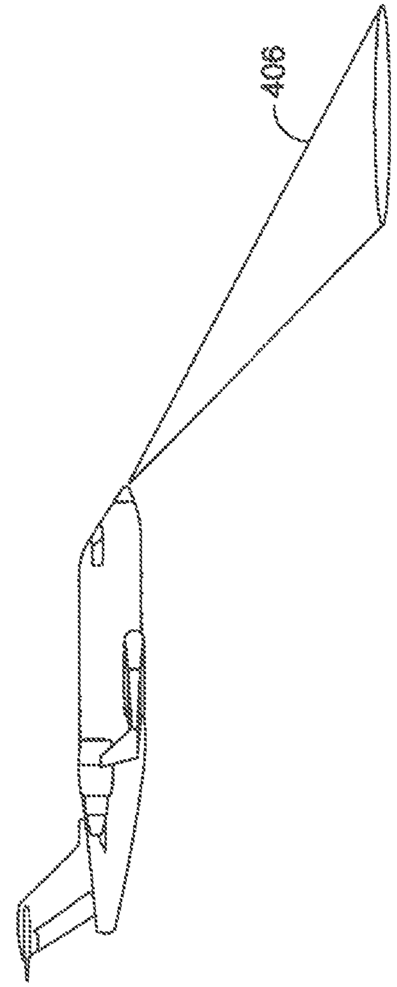
Figure 5C:
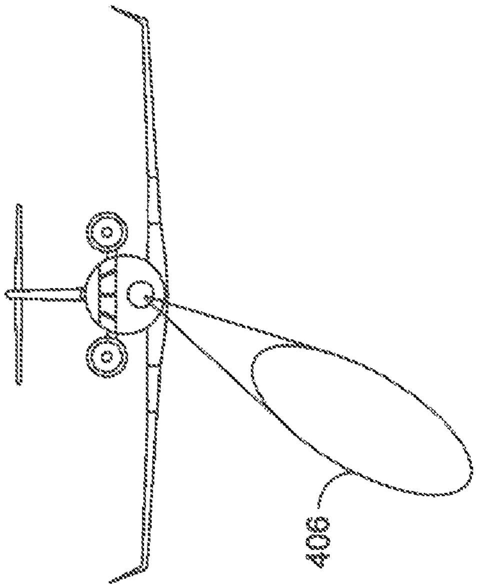
Figure 6:
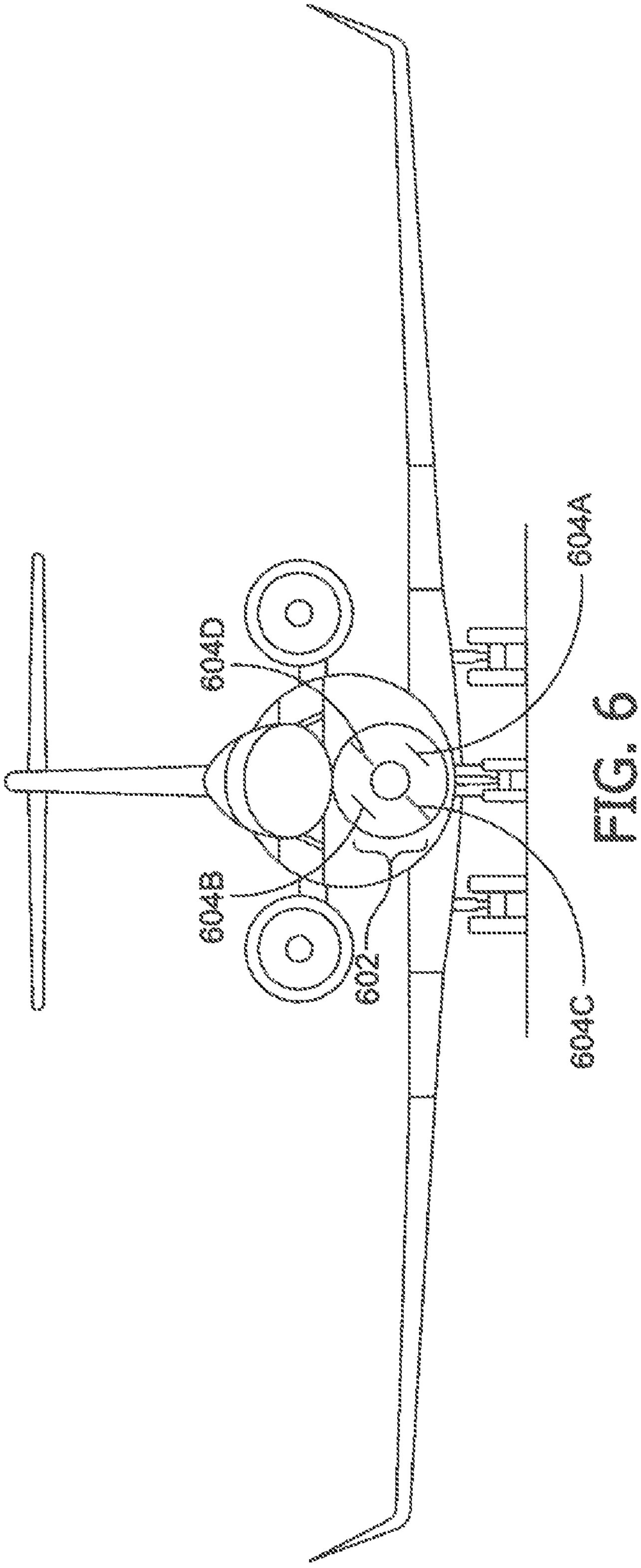
FIG. 6 is front view of still another directional antenna installed in a nose section of an aircraft.
Figure 7C:
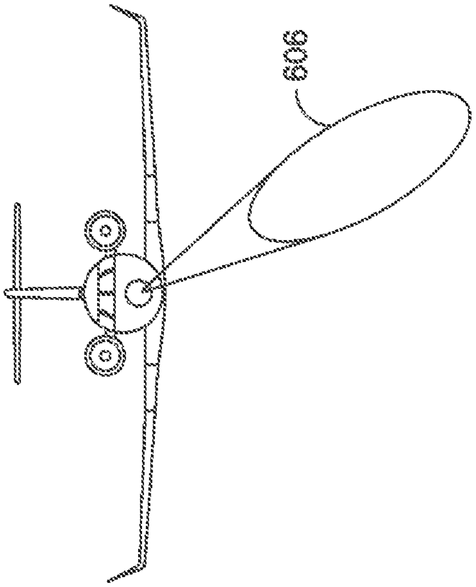
FIG. 7*a-c* illustrates the directional beam provided by the directional antenna of FIG. 6.
Figure 7A:
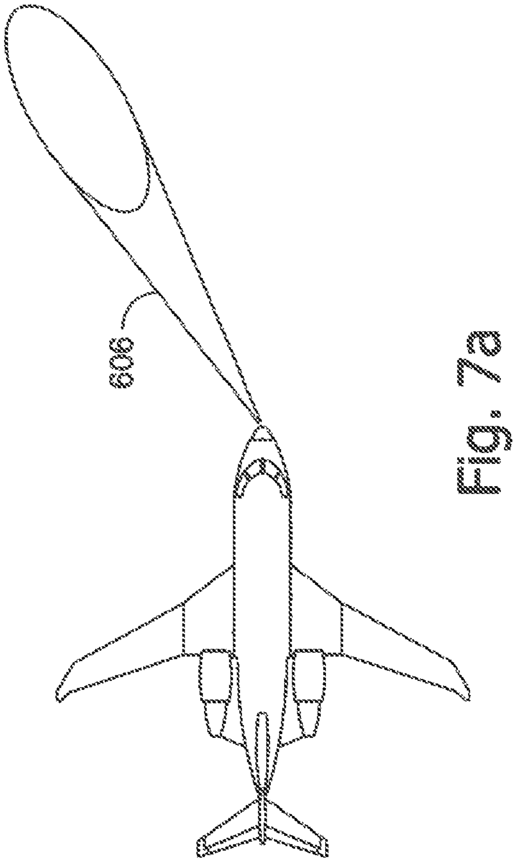
Figure 7B:
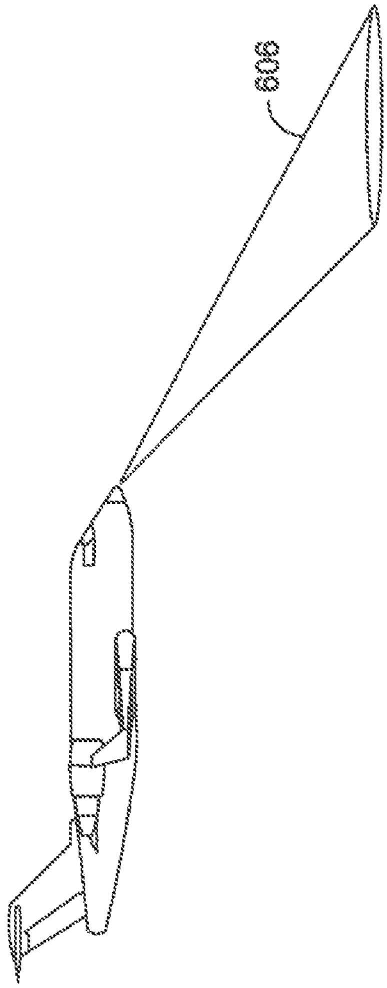

Referring to FIG. 3*a*-*c*, a set of illustrations depicting the directional beam 206 provided by the horizontally polarized antenna stack 202 of FIG. 2 is shown. In a specific configuration, a phase angle of 180° may be introduced to the third antenna element 204C while the phase angles for the first, the second and the fourth antenna elements are set at zero. Such a configuration may allow the antenna stack 202 to provide a forward looking center beam 206 directed towards the ground ahead of the aircraft. As illustrated in FIG. 3*a*-*c*, the beam provided by the antenna stack 202 may define enough directionality to reduce the field of view of ground cellular stations. Reducing the number of ground stations visible to the aircraft antenna may reduce transmit and receive interference effects.

It is contemplated that a controller may be utilized to control the operations of the antenna stack 202. The controller may be implemented as a processing unit, a computing device, an integrated circuit, or any control logic (stand-alone or embedded) communicatively connected to the antenna stack 202. The controller may be located in the nose section of the aircraft. Alternatively, the controller may be located elsewhere on the aircraft and communicatively connected to the antenna stack 202 via wired or wireless communication means.

In addition to establishing communications with ground stations directly ahead of the aircraft, there may be situations where the antenna 200 may need to establish communications with ground stations to the right or to the left (all directions referred herein are with respect to the direction of travel) of the aircraft. For example, if no ground station is located within the field of view of the beam 206, or that the signal strength provided by the ground station located within the field of view of the beam 206 is not ideal, the controller 208 may be configured for controlling the phase angles of the antenna elements of the antenna stack 202, which in turn may adjust the direction of the beam 206. For instance, by changing (e.g., increasing or decreasing) the phase angle of the third antenna element 204C while keeping the phase angles of the other antenna elements unchanged, the direction of the beam 206 may be steered slightly to the right or to the left. The controller may also change the phase angle of any antenna element of the antenna stack 202, thus, providing adjustments in all directions.

While having the ability to adjust the direction of the beam 206 utilizing phase angle adjustments may be appreciated, there may be situations where the antenna 200 may need to communicate with ground stations much to the right or much to the left of the aircraft that are beyond what phase angle adjustments may provide. Therefore, the antenna 200 may be equipped with additional antenna stacks to provide communications in such situations. It is contemplated that the additional antenna stacks may be configured similarly to the antenna stack 202, but tilted at an angle in order to provide directional beam to the right or to the left of the direction of travel of the aircraft.

Referring to FIGS. 4 and 5*a*-*c*, an additional antenna stack 402 (tilted clockwise with respect to the antenna stack 202) is shown. The antenna elements of the antenna stack 402 and their layout may be configured similarly to those of the antenna stack 202. For example, a phase angle of 180° may also be introduced to the third antenna element 404C while the phase angles for the first, the second and the fourth antenna elements (404A, 404B and 404D, respectively) are set at zero. In this manner, the antenna stack 402 may provide a forward looking right (with respect to the direction of travel) beam 406 directed towards the ground ahead of the aircraft, as illustrated in FIG. 5. It is contemplated that the same antenna controller may be utilized to control the operations of the antenna stack 402. For example, the controller may change the phase angle of any antenna element of the antenna stack 402 to provide some directional adjustments as well.

Referring to FIGS. 6 and 7*a*-*c*, another antenna stack 602 (tilted counterclockwise with respect to the antenna stack 202) is shown. The antenna elements of the antenna stack 602 and their layout may be configured similarly to those of the antenna stack 202. For example, a phase angle of 180° may also be introduced to the third antenna element 604C while the phase angles for the first, the second and the fourth antenna elements (604A, 604B and 604D, respectively) are set at zero. In this manner, the antenna stack 602 may provide a forward looking left (with respect to the direction of travel) beam 606 directed towards the ground ahead of the aircraft, as illustrated in FIG. 7. It is contemplated that the antenna controller may also be utilized to control the operations of the antenna stack 602. For example, the controller may change the phase angle of any antenna element of the antenna stack 602 to provide some directional adjustments.

Figure 8:
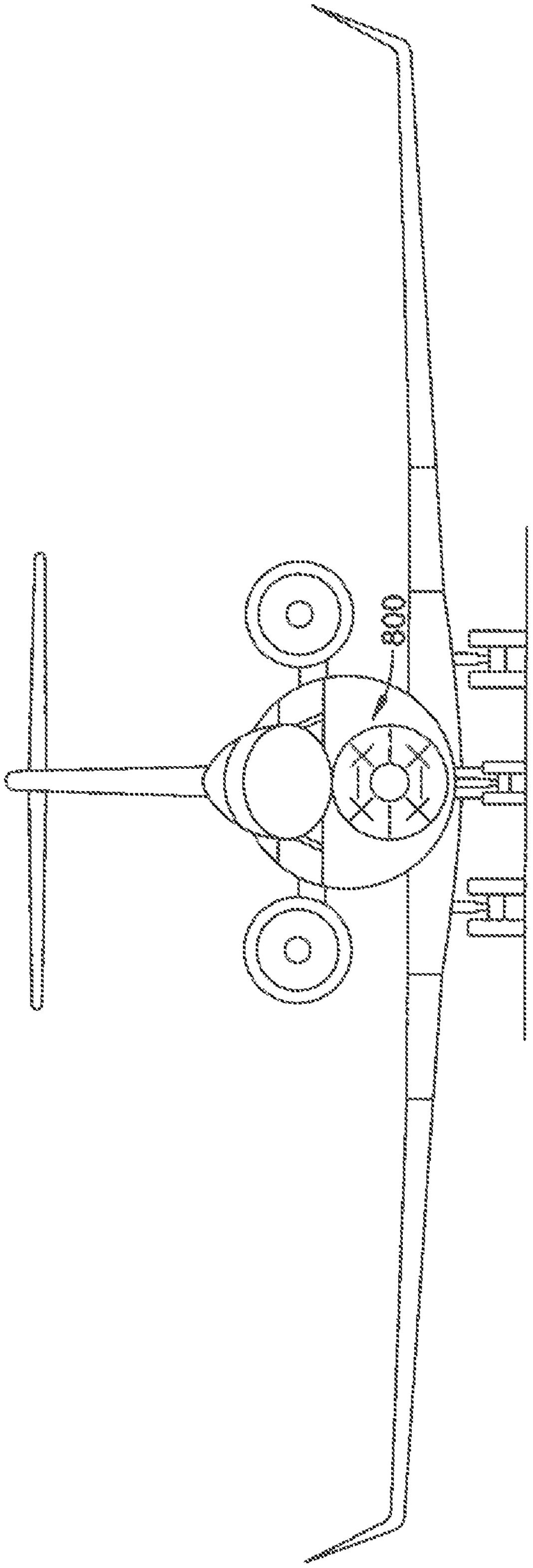
FIG. 8 is front view of a directional antenna installed in a nose section of an aircraft, the directional antenna including multiple antenna stacks.

Referring to FIG. 8, an air-to-ground antenna 800 including the first antenna stack 202, the second antenna stack 402, and the third antenna stack 602 is shown. In one embodiment, the second antenna stack 402 is tilted (e.g., 45° clockwise with respect to the first antenna stack 202 and the third antenna stack 602 is tilted (e.g., 45°) counterclockwise with respect to the first antenna stack 202. The air-to-ground antenna 800 further includes the controller communicatively connected to the antenna stacks. The controller may adjust the phase angle of any antenna element of the antenna stacks as previously described.

Furthermore, the controller may selectively activate one of the first antenna stack 202, the second antenna stack 402 or the third antenna stack 602. In this manner, the directional beam of the antenna 800 may be steered to the center, to the right, or to the left, respectively. That is, in accordance with the present disclosure, the directional beam of the antenna 800 may be steered without physically steering the antenna 800 installed on the aircraft, and no mechanical movement of any antenna element is required. Since the antenna 800 does not require any moving parts, the antenna 800 may be installed on the surface around the weather radar with minimal interference to the existing components and with minimal installation complexity. The unique low profile design of the antenna also allows the weather radar to pan freely without any mechanical interference from the antenna.

Figure 9:
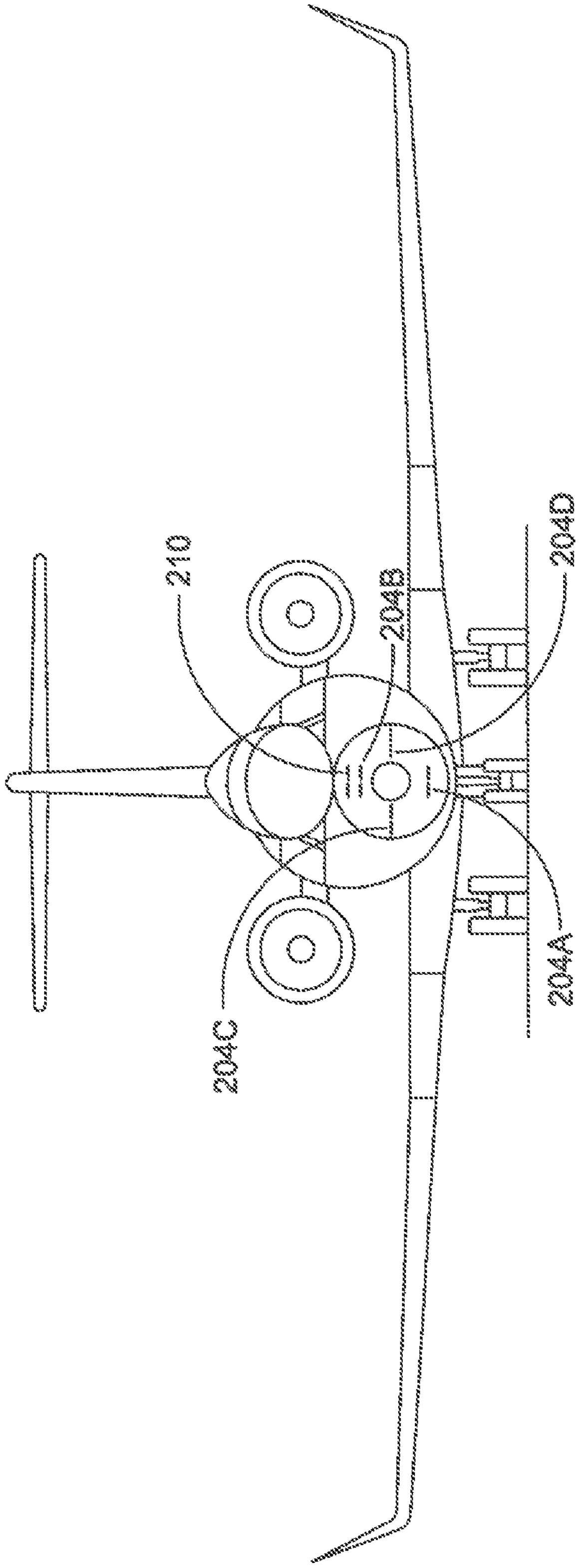
FIG. 9 is front view of a directional antenna installed in a nose section of an aircraft, the directional antenna including an additional antenna element for directing the beam downward.
Figure 10A:
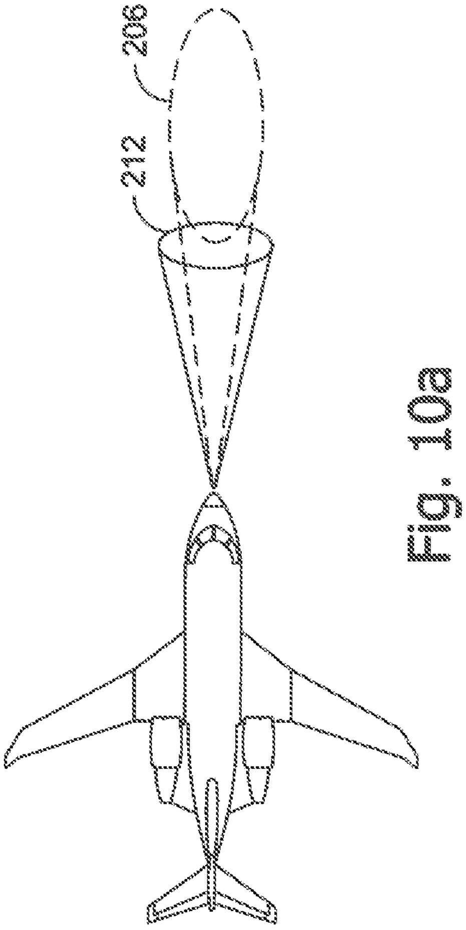
FIG. 10*a-c* illustrates the directional beam provided by the directional antenna of FIG. 9.
Figure 10C:
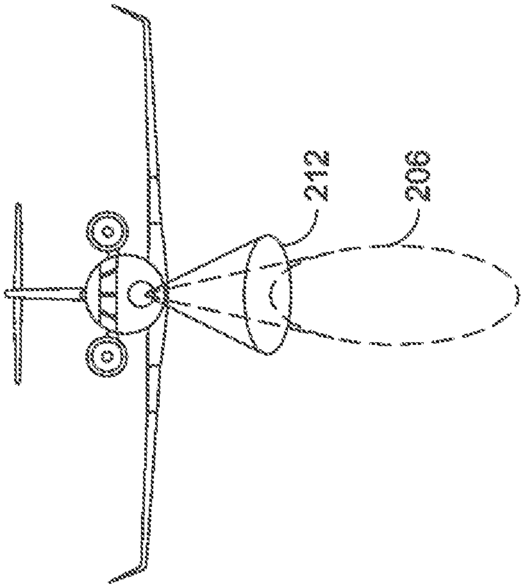
Figure 10B:
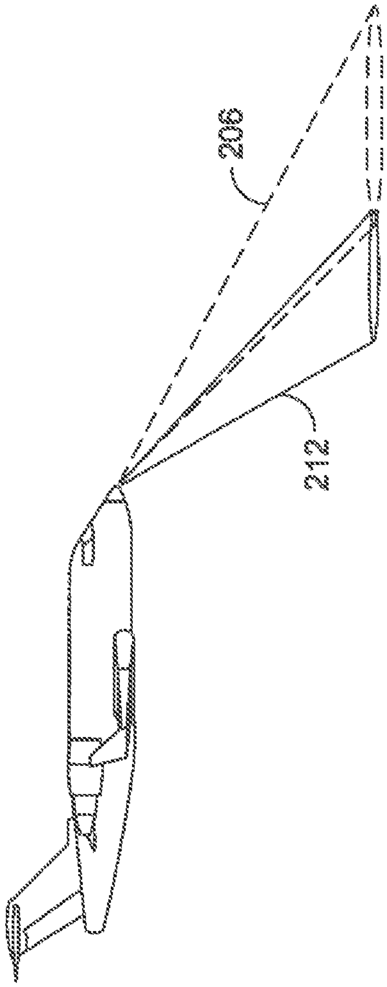

It is contemplated that there may be situations where the air-to-ground antenna in accordance with the present disclosure may need to direct the beam more downwardly to the ground than previously described (which are more forward looking beams in comparison). Referring to FIGS. 9 and 10, an additional antenna element 210 may be introduced to the antenna stack 202 (as an example) to help directing the beam 206 downward. In one embodiment, antenna elements 204A through 204D are radially separated by one wavelength (e.g., about 15 inches for the 700 MHz band implementation) center-to-center. The additional antenna element 210 may be placed about a half wavelength (e.g., about 7.5 inches for the 700 MHz band implementation) directly above the second antenna element 204B. Furthermore, this additional antenna element 210 may have a phase angle of 180° and may be driven by a greater signal level. For example, the antenna controller may drive this additional antenna element 210 at amplitude that is multiple times (e.g., 2 or 4 times) greater than the other antenna elements in the same stack 202. By driving the additional antenna element 210 at greater amplitude, the resultant beam 212 may point more downwardly to the ground, as illustrated in FIG. 10 *a-c*.

It is also contemplated that the second antenna stack 402 and the third antenna stack 602 may also include the additional antenna elements to help directing their respective beams downward. Furthermore, the additional antenna elements included in the antenna stacks may be selectively engaged by the antenna controller. In this manner, each of the antenna stacks 202, 402 and 602 may provide a beam that may be adjusted downwardly or forwardly, based on whether the additional antenna element is engaged and the specific amplitude applied to the additional antenna element by the controller.

While the antenna stacks as previously described may utilize horizontally polarized antenna elements, it is noted that most cellular networks (such as GSM, LTE, WiMax and others) may utilize both vertical and horizontal polarizations to adapt to mobile user handsets. Therefore, it may be appreciated for the air-to-ground antenna of the present disclosure to support both horizontal and vertical array types, which may mitigate the risk of loosing antenna gain during element switching from horizontal to vertical or vice versa.

Figure 11:
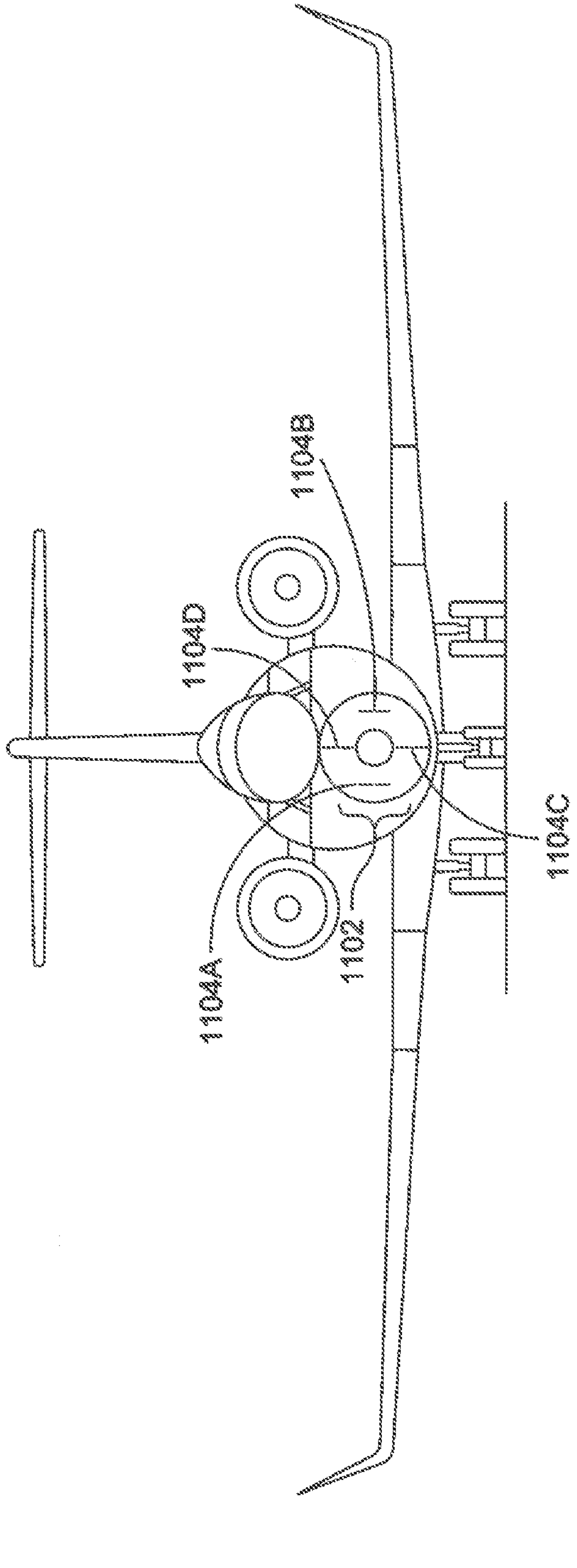
FIG. 11 is front view of a directional antenna installed in a nose section of an aircraft, the directional antenna including a vertically polarized antenna stack.

Referring to FIG. 11, a vertically polarized antenna stack 1102 is shown. The antenna stack 1102 may include multiple antenna elements 1104 positioned on the surface 106 around the airborne weather radar 104. The antenna elements 1104 within the antenna stack 1102 are oriented in the same orientation. For instance, in the example illustrated in FIG. 11, all antenna elements 1104 of antenna stack 1102 are oriented so that they are perpendicular to the lateral axis of the aircraft.

In one embodiment, the antenna stack 1102 may include a first vertically polarized antenna element 1104A positioned on the surface 106 on one side of the weather radar 104 and a second vertically polarized antenna element 11048 positioned on the surface 106 on the opposing side of the weather radar 104. Each antenna element may be configured as a dipole antenna, a monopole antenna, a patch antenna, a folded antenna, a loop antenna, a stripline antenna or the like. It is contemplated that the antenna stack 1102 may include more vertically polarized antenna elements without departing from the spirit and scope of the present disclosure.

As the example illustrated in FIG. 11, the antenna stack 1102 may include a third vertically polarized antenna element 1104C positioned on the surface 106 below the weather radar 104 and a fourth vertically polarized antenna element 1104D positioned on the surface 106 above the weather radar 104. The third antenna element 1104C and the fourth antenna element 1104D are so positioned to accommodate for the space occupied by the weather radar 104.

While the antenna stack 1102 formed by four antenna elements may provide better directional control compared to an alternative configuration with fewer antenna elements, it is contemplated that the specific configuration of the antenna stack may be limited by the space available around the weather radar 104. Therefore, the antenna stack 1102 may include different number of antenna elements for different installation environment.

Figure 12A:
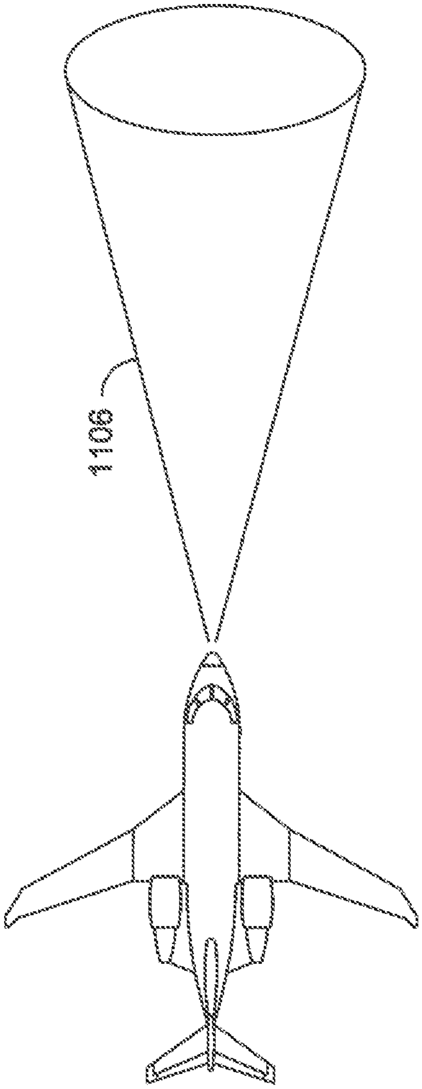
FIG. 12*a-b* illustrates the directional beam provided by the directional antenna of FIG. 11.
Figure 12B:
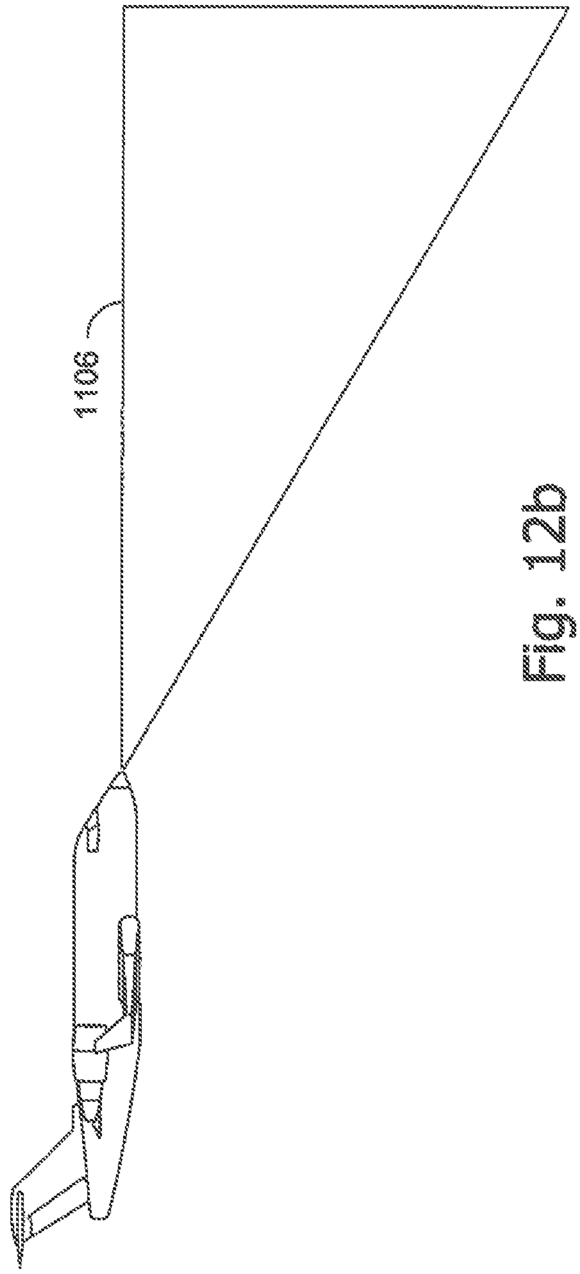

Referring to FIG. 12*a-b*, a set of illustrations depicting the directional beam 1106 provided by the vertically polarized antenna stack 1102 is shown. In a specific configuration, a phase angle of 180° may be introduced to the third antenna element 1104C while the phase angles for the first, the second and the fourth antenna elements are set at zero. Such a configuration may allow the vertically polarized antenna stack 1102 to provide a forward beam 1106 directed towards the horizon ahead of the aircraft. The vertically polarized antenna stack 1102 may support vertical electromagnetic (EM) modes provided by the cellular networks.

It is contemplated that the vertically polarized antenna stack 1102 may be installed together with antenna stacks 202, 402 and 602. It is understood, however, that whether to utilize the antenna stack 1102 may be optional, and may be subject to various considerations such as space availabilities, power consumptions, cellular network configurations, as well as other factors.

Figure 13:
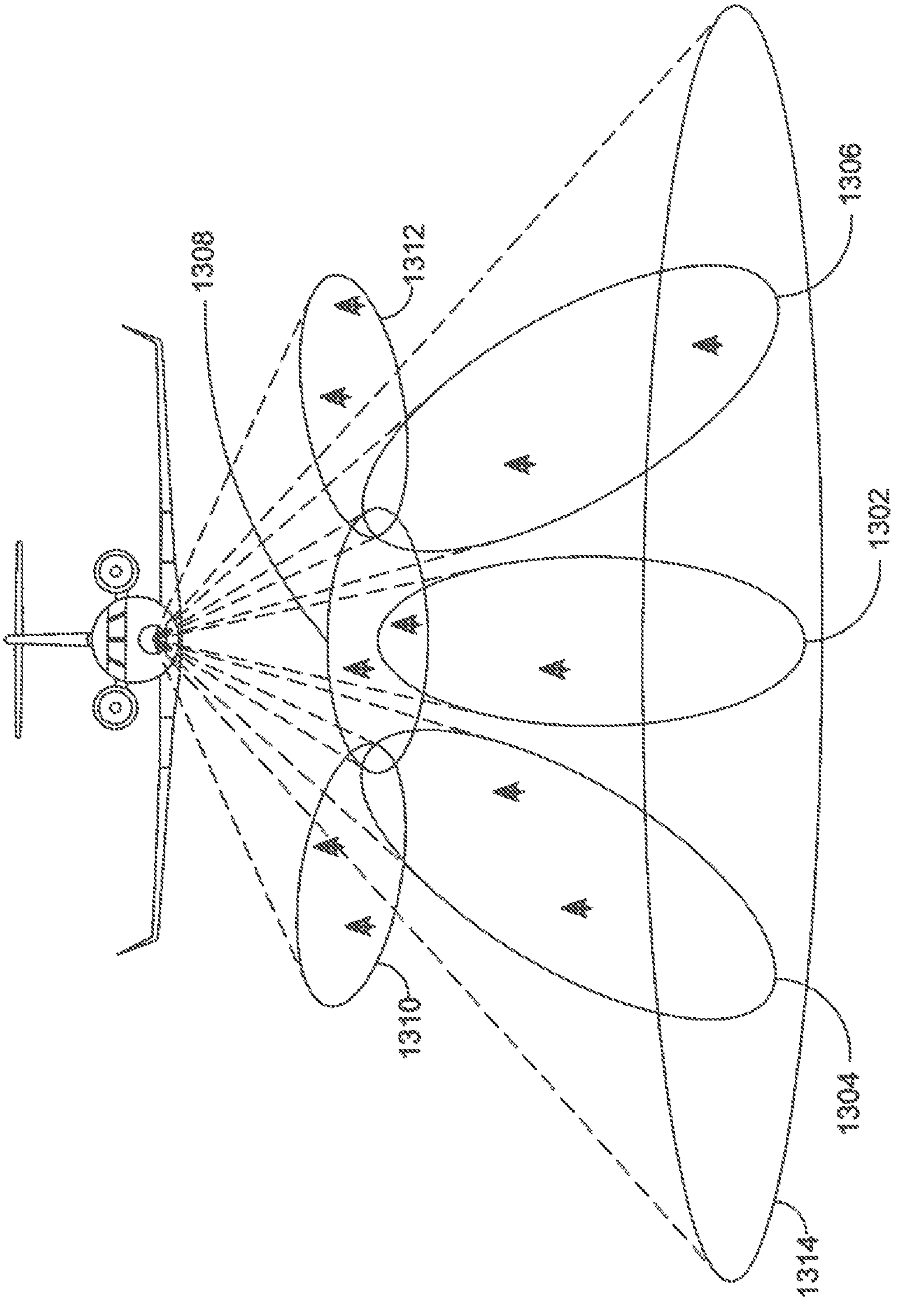
FIG. 13 illustrates the directional beam provided by a directional antenna having multiple antenna stacks.

FIG. 13 is an illustration depicting the directional beam that may be provided utilizing the air-to-ground antenna in accordance with the present disclosure. The air-to-ground antenna may include antenna stacks 202, 402, 602 as previously described. The directional beam of the antenna may be steered without physically steering the antenna installed on the aircraft. For example, the antenna stack 202 may be selected and configured to provide a forward looking center beam 1302, the antenna stacks 402 may be selected and configured to provide a forward looking right beam 1304 and the antenna stacks 602 may be selected and configured to provide a forward looking left beam 1306. In addition, if additional antenna elements are utilized to help direct the beams downwardly towards the ground, then the antenna stack 202 may be able to provide a downward facing center beam 1308, the antenna stacks 402 may be able to provide a downward facing right beam 1310 and the antenna stacks 602 may be able to provide a downward facing left beam 1312. Furthermore, the air-to-ground antenna may include the vertically polarized antenna stack 1102 as previously described. The antenna stack 1102 may be configured to provide a forward beam 1314 directed towards the horizon to support vertical EM modes provided by the cellular networks.

It is understood that the beams depicted in FIG. 13 are merely exemplary; the actual directions/shapes of the beams may differ without departing from the spirit and scope of the present disclosure. For example, different directions/shapes may be obtained by adjusting the phase angles of the antenna elements, and/or drive the antenna elements at different amplitude, as previously described. It is also understood that the air-to-ground antenna may include more antenna stacks that are tilted at different angles not specifically shown in the figures (to provide additional directional beams, if necessary).

It is contemplated that the controller utilized to control the operation of the air-to-ground antenna may be configured to selectively activate one or more antenna stacks based on the available ground stations and the location of the aircraft. For example, the locations of the ground stations and their beam directions may be known (e.g., provided by the cellular service providers) and stored in a database communicatively connected to the controller. In addition, the current location and the direction of travel of the aircraft may also be determined utilizing a positioning system (e.g., a global positioning unit (GPS), an inertial navigation system (INS), or the like). Based on the current location and the direction of travel of the aircraft, the controller of the air-to-ground antenna may determine the available/visible ground stations and selectively activate one or more antenna stacks accordingly. For instance, the controller may selectively activate the antenna stacks to maximize connectivity and minimize interferences.

Furthermore, the controller of the air-to-ground antenna may also be configured to control the transmit power of the antenna based on the RF visibility with available ground stations and the location of the aircraft. An exemplary system and method for controlling transmit power and/or steering antenna of a mobile communication system in air-to-ground communications is disclosed in co-pending U.S. patent application Ser. No. 12/891,107 filed on Sep. 27, 2010 and entitled "Doppler Compensated Communications Link," which is incorporated herein by reference.

The directional antenna in accordance with the present disclosure may provide several advantages. For example, the directional antenna may be utilized to reject unwanted ground stations (e.g. in urban environments where ground stations may be close together and may have high user traffic) and direct communications with regions known to be lower in data traffic or having fewer towers (less interferences). The ability to reject unwanted ground stations (may also be known as pointing null to the unwanted ground stations) may be appreciated especially when traveling through urban areas. The directional antenna may also enable a "Smart Antenna" system where elements are driven such that desired ground towers are provided highest gain and undesired towers are provided lower gain. The smart antenna system may utilize channel measurement and signal processing to develop the required beam and pointing. Optionally, beam forming may be derived from direction, bearing and tower database information, as disclosed in co-pending U.S. patent application Ser. No. 12/891,139 filed on Sep. 27, 2010 and entitled "Airborne Cell Tower Selection System and Method," which is incorporated herein by reference.

It may be appreciated that the directivity provided by the antenna of the present disclosure not only reduces the field of view of ground cellular stations (reduces transmit and receive interferences), but also provides greater antenna gain (dB) compare to other configurations. For instance, the antenna stacks as described above have narrower beams and therefore may provide much greater gain than a simple dipole antenna. The greater gain may provide the ability to "close" air-to-ground links over significant distances particularly in areas having few tower assets, allowing the aircraft to cross larger areas that may not have ground stations (e.g., desert or mountainous areas) for 50 to 75 miles or more. The large antenna gain capability uniquely allows the aircraft to close RF link with ground towers that have antenna beam pointed downward instead of skyward. Beam losses represent 30 dB or more. Furthermore, greater antenna gain may also enable better utilizations of the high bit rates available on the LTE network. For instance, the antenna of the present disclosure may provide 6 to 12 dB of gain (or higher depending on the specific frequency band being used), while other in-flight data solutions may only provide about 2 to 6 dB of gain. The greater gain provided utilizing the antenna of the present disclosure may support more network activities such as live video streaming as well as other live and timely content deliveries.

Additionally, it is noted that the unique beam coverage generated by the tilted antenna stacks (antenna stacks 402 and 602 in the examples above) are tilted at an angle between the vertical plane and the horizontal plane, which may provide unique abilities for such antenna stacks to communicate with both vertically and horizontally polarized signals from ground stations. Such abilities may be appreciated as a dual polarization antenna system that minimizes signal losses and also mitigates the risk of loosing antenna gain and beam coverage during aircraft banking, turning and climb, decent maneuvers and when element switching from horizontal to vertical or vice versa.

It may also be appreciated that in one embodiment of the present disclosure, the air-to-ground antenna is uniquely placed around, attached to, or packaged together with a weather radar unit. The antenna elements in this arrangement may radiate without much far-field radiation hinderance because the wavelength and placement of elements within the 698-3600 MHz cell bands, is generally harmonious in electrical and mechanical relation to the weather radar's form-factor diameter (about 12-13 inches). It is understood that various other cellular bands and standards may be utilized without departing from the spirit and scope of the present disclosure.

Furthermore, the radial arrangement of the antenna stacks may provide a unique and effective way of obtaining side-look capability. That is, a standard phased array may not be able to obtain sharp look angles though element phasing alone. In contrast, utilizing the switched radial arrangement in accordance with the present disclosure, separate radial antennas may be placed at fixed radial angles and individually switched to obtain large side-look angles. Furthermore, the small physical profile of the air-to-ground antenna of the present disclosure uniquely makes use of rare surface area on the aircraft, allowing it to be placed behind the nose cone of the aircraft that is EM transparent (allows RF in and out). In contrast, other antenna designs may require a separate radome for fuselage, tail or wing mounted systems, which may introduce additional air-flow resistance and reduce air mileage.

It is contemplated that in one embodiment of the present disclosure, the air-to-ground antenna may include a ground plane that forms a reflector/director for the antenna stacks. The ground plane may be a metallic ground plane installed about one quarter wavelength behind the antenna stacks. This ground plane may be customized to an aircraft or aircraft type. It is understood that various other types/configurations of ground plane may be utilized without departing from the spirit and scope of the present disclosure.

In addition, a RF coupler may be utilized as a part of the directional antenna for impedance matching between radio signals and antenna elements. A phase and amplitude control may also be included to program nominal beam direction.

Furthermore, RF channel feedback (S/N) may be used with the antenna controller to fine adjust the beam position and RF power. For instance, a mutual coupling array process may make use of sampled antenna impedance measurements and may also include a lookup table and/or use of active feedback to compensate for antenna elements and/or ground plane coupling in order to compensate and trim phase and gain.

It is contemplated that the directional antenna of the present disclosure may also be configured to be MIMO (Multiple Input Multiple Output) compatible to enhance aggregate signal power to achieve higher data rates requiring higher order modulation (e.g. 64 QAM). For instance, one or more MIMO antennas may be added to the directional antenna. Such MIMO antennas may be conditionally engaged to communicate with ground stations that provide MIMO for greater data throughput capability. Alternatively, instead of adding additional MIMO antennas, the existing antenna stacks may be configured to be MIMO compatible. In this manner, when a particular antenna stack is engaged for air-to-ground communication as previously described, other stacks that are not engaged (i.e., the unutilized stacks) may be used for MIMO communication purposes. It is contemplated that various other techniques may be utilized to provide MIMO compatibility without departing from the spirit and scope of the present disclosure.

In addition to providing communication with ground-based cellular networks, the air-to-ground antenna of the present disclosure may be utilized to provide communications for various purposes. For instance, the air-to-ground antenna of the present disclosure may be utilized to provide the back-channel from an aircraft to a terrestrial network as described in U.S. Pat. No. 6,529,706 entitled "Aircraft Satellite Communications System for Distributing Internet Service from Direct Broadcast Satellites". In another example, the air-to-ground antenna of the present disclosure may be utilized to implement the cellular link for the on-board entertainment system as described in U.S. Pat. No. 6,741,841 entitled "Dual Receiver for a On-Board Entertainment System".

It is contemplated, however, that the air-to-ground antenna in accordance with the present disclosure is not limited to be installed around weather radars. That is, while the antenna elements included in the air-to-ground antenna may be positioned to accommodate for the space occupied by the weather radar, such positions are not meant to be limiting. For instance, the air-to-ground antenna may still be installed in the nose section of the aircraft even if the aircraft does not have a weather radar. Furthermore, while the nose section of the aircraft may be a preferred location for installing the air-to-ground antenna, such a location is not meant to be limiting either. It is understood that the air-to-ground antenna may be installed on any support surface provided by the aircraft without departing from the spirit and scope of the present disclosure.

It is further contemplated that utilization of the directional antenna in accordance with the present disclosure is not limited to aircrafts only. The directional antenna may be installed on other devices and/or configured as a standalone system. The ability to steer the directional beam of the antenna without physical/mechanical movement of the antenna elements may be appreciated in various situations. For instance, such antennas may have relatively small physical profiles and therefore may be suitable for devices/vehicles where available spaces may be limited. In another example, such antennas may be useful in environments where physical movements may be undesirable (e.g., in a hostile environment where physical movements of a hidden antenna may reveal its location). It is understood that the directional antenna in accordance with the present disclosure may be utilized in various other situations not specifically mentioned, without departing from the spirit and scope of the present disclosure.

Figure 14:
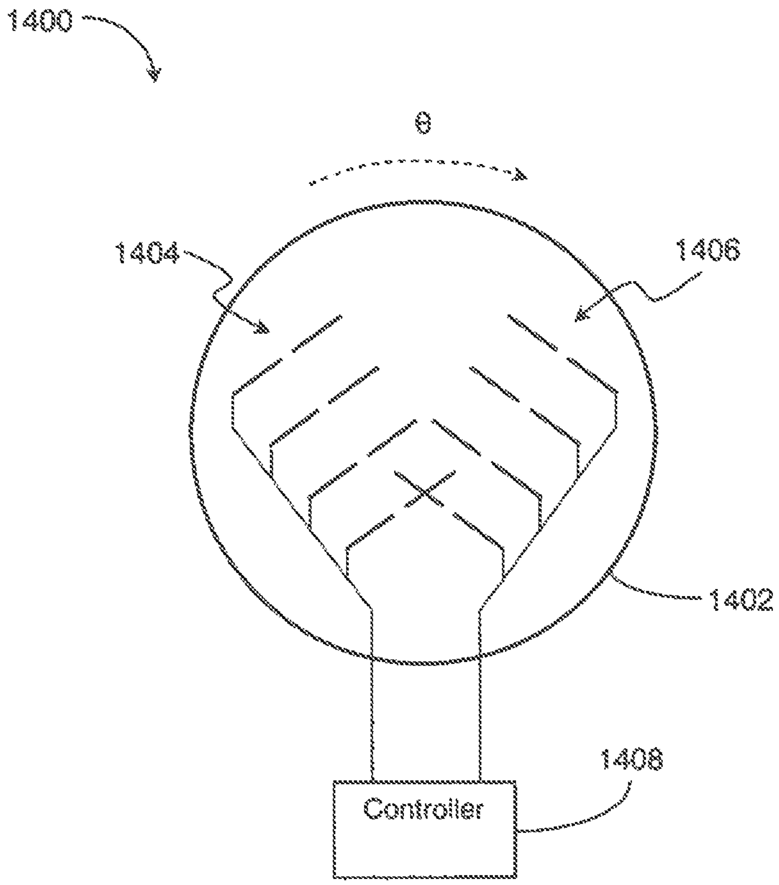
FIG. 14 illustrates an exemplary directional antenna that may be utilized in various environments in addition to air-to-ground communications.

FIG. 14 is an illustration depicting an exemplary directional antenna 1400 that may be utilized in various environments. The directional antenna 1400 includes a support structure 1402 for defining a support surface and at least two antenna stacks for providing directional beams towards at least two different directions. For example, the directional antenna 1400 may include a first antenna stack 1404 positioned on the support surface. The first antenna stack 1404 may include multiple antenna elements that are oriented in the same orientation (may be referred to as the first orientation). The directional antenna 1400 may also include a second antenna stack 1406 positioned on the support surface. The second antenna stack 1406 may include multiple antenna elements that are oriented in another orientation (may be referred to as the second orientation) different from the first orientation. More specifically, the second orientation may be rotated a predetermined angle $\theta$ with respect to the first orientation, allowing the second antenna stack 1406 to concentrate radiations in a direction that is different from the first antenna stack 1404.

The directional antenna 1400 may also include a controller 1408 communicatively connected with the first antenna stack 1404 and the second antenna stack 1406. The controller 1408 is configured for selectively activating one of the first antenna stack 1404 or the second antenna stack 1406 to steer the radiations of the directional antenna 1400 in different directions without physical/mechanical movement of the antenna stacks 1404 and 1406. It is contemplated that additional antenna stacks may also be included in the directional antenna 1400. Furthermore, the controller 1408 may be configured for adjusting phase angles of the antenna elements as previously described.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A directional antenna, comprising:

a support structure for defining a generally planar support surface;

a first planar antenna stack positioned on the generally planar support surface, the first planar antenna stack having a plurality of antenna elements, the plurality of antenna elements of the first planar antenna stack being oriented in a first orientation, allowing the first planar antenna stack to concentrate radiations in a first direction;

a second planar antenna stack positioned on the generally planar support surface, the second planar antenna stack having a plurality of antenna elements, the plurality of antenna elements of the second planar antenna stack being oriented in a second orientation, the second orientation being rotated a predetermined angle with respect to the first orientation, allowing the second planar antenna stack to concentrate radiations in a second direction different from the first direction; and a controller communicatively connected with the first planar antenna stack and the second planar antenna stack, the controller being configured for selectively activating at least one of: the first planar antenna stack for concentrating radiations of the directional antenna in the first direction, or the second planar antenna stack for concentrating radiations of the directional antenna in the second direction.

2. The directional antenna of claim 1, further comprising:

a third planar antenna stack having a plurality of antenna elements, the plurality of antenna elements of the third planar antenna stack being oriented in a third orientation, allowing the third planar antenna stack to concentrate radiations in a third direction different from the first direction and the second direction; and the controller being configured for selectively activating at least one of: the first planar antenna stack for concentrating radiations of the directional antenna in the first direction, the second planar antenna stack for concentrating radiations of the directional antenna in the second direction, or the third planar antenna stack for concentrating radiations of the directional antenna in the third direction.

3. The directional antenna of claim 1, wherein the controller is further configured for providing a phase adjustment to at least one of the plurality of antenna elements of the first planar antenna stack, the phase adjustment allowing the first planar antenna stack to concentrate radiations in an adjusted direction.

4. The directional antenna of claim 1, wherein each one of the plurality of antenna elements of the first planar antenna stack is horizontally polarized.

5. The directional antenna of claim 1, wherein each one of the plurality of antenna elements of the first planar antenna stack is horizontally polarized, and each one of the plurality of antenna elements of the second planar antenna stack is vertically polarized.

6. The directional antenna of claim 1, wherein each one of the plurality of antenna elements of the first planar antenna stack and each one of the plurality of antenna elements of the second planar antenna stack comprise at least one of: a dipole antenna, a monopole antenna, a patch antenna, a folded antenna, a loop antenna, or a stripline antenna.

7. The directional antenna of claim 1, wherein the first planar antenna stack and the second planar antenna stack are adapted to provide air-to-ground communications.

8. An air-to-ground communication system for installation in an aircraft, the aircraft providing a generally planar support surface for the air-to-ground communication system, the air-to-ground communication system comprising:

a first planar antenna stack positioned on the generally planar support surface, the first planar antenna stack having a plurality of antenna elements, the plurality of antenna elements of the first planar antenna stack being oriented in a first orientation, allowing the first planar antenna stack to concentrate radiations in a first direction;

a second planar antenna stack positioned on the generally planar support surface, the second planar antenna stack having a plurality of antenna elements, the plurality of antenna elements of the second planar antenna stack being oriented in a second orientation, allowing the second planar antenna stack to concentrate radiations in a second direction different from the first direction; and a controller communicatively connected with the first antenna stack and the second antenna stack, the controller being configured for selectively activating at least one of: the first planar antenna stack for concentrating radiations of the directional antenna in the first direction, or the second planar antenna stack for concentrating radiations of the directional antenna in the second direction.

9. The air-to-ground communication system of claim 8, further comprising:

a third planar antenna stack positioned on the support surface, the third planar antenna stack having a plurality of antenna elements, the plurality of antenna elements of the third planar antenna stack being oriented in a third orientation, allowing the third planar antenna stack to concentrate radiations in a third direction different from the first direction and the second direction; and the controller being configured for selectively activating at least one of: the first planar antenna stack for concentrating radiations of the directional antenna in the first direction, the second planar antenna stack for concentrating radiations of the directional antenna in the second direction, or the third planar antenna stack for concentrating radiations of the directional antenna in the third direction.

10. The air-to-ground communication system of claim 8, wherein at least one of the plurality of antenna elements of the first planar antenna stack is a Multiple Input Multiple Output (MIMO) compatible antenna, and the MIMO compatible antenna of the first planar antenna stack is utilized for providing MIMO communication with a ground station.

11. The air-to-ground communication system of claim 8, wherein the controller is further configured for providing a phase adjustment to at least one of the plurality of antenna elements of the first planar antenna stack, the phase adjustment allowing the first planar antenna stack to concentrate radiations in an adjusted direction.

12. The air-to-ground communication system of claim 8, wherein each one of the plurality of antenna elements of the first planar antenna stack is horizontally polarized.

13. The air-to-ground communication system of claim 8, wherein each one of the plurality of antenna elements of the first planar antenna stack and each one of the plurality of antenna elements of the second planar antenna stack comprise at least one of: a dipole antenna, a monopole antenna, a patch antenna, a folded antenna, a loop antenna, or a stripline antenna.

14. The air-to-ground communication system of claim 8, further comprising:

a location database communicatively connected with the controller, the location database being configured for providing locations of ground communication stations; and the controller being configured for selectively activating at least one of: the first planar antenna stack or the second planar antenna stack based on a location of the aircraft and the locations of ground communication stations.

15. An air-to-ground communication system for installation on a generally planar surface around an airborne weather radar, the air-to-ground communication system comprising:

a planar antenna stack positioned on the generally planar surface around the airborne weather radar, the planar antenna stack having a plurality of antenna elements, the plurality of antenna elements comprising:

a first antenna element positioned on the generally planar surface below the airborne weather radar;

a second antenna element positioned on the generally planar surface above the airborne weather radar;

a third antenna element positioned on the generally planar surface on one side of the airborne weather radar; and a fourth antenna element positioned on the generally planar surface on another side of the airborne weather radar, wherein the first, the second, the third and the fourth antenna elements of the planar antenna stack are oriented in a same orientation; and a controller communicatively connected with the planar antenna stack, the controller being configured for controlling a phase angle of at least one of the plurality of antenna elements of the planar antenna stack, allowing the planar antenna stack to concentrate radiations in a direction.

16. The air-to-ground communication system of claim 15, wherein the planar antenna stack further comprises:

a fifth antenna element positioned on the generally planar surface above the second antenna element, the fifth antenna element being oriented in the same orientation and being operated at a higher gain compared to the first, the second, the third and the fourth antenna elements.

17. The air-to-ground communication system of claim 15, wherein each one of the plurality of antenna elements of the planar antenna stack is horizontally polarized.

18. The air-to-ground communication system of claim 17, further comprising:

a second planar antenna stack positioned on the generally planar surface around the airborne weather radar, the second planar antenna stack having a plurality of antenna elements oriented in a second orientation, the second orientation different from the first mentioned orientation; and the controller communicatively connected with the second antenna stack, the controller being configured for controlling a phase angle of at least one of the plurality of antenna elements of the second planar antenna stack, allowing the second antenna stack to concentrate radiations in a second direction.

19. The air-to-ground communication system of claim 17, further comprising:

a second planar antenna stack positioned on the generally planar surface around the airborne weather radar, the second planar antenna stack having a plurality of vertically polarized antenna elements; and the controller communicatively connected with the second planar antenna stack, the controller being configured for selectively activating at least one of: the first mentioned planar antenna stack or the second planar antenna stack.

* * * * *